Sept. 8, 1953  J. W. CARTER  2,651,443
BAG HOLDER, CARRIAGE, AND TRACK ASSEMBLY
Filed July 31, 1947  11 Sheets-Sheet 2

Inventor
Jack. W. Carter
By Shreve, Crosse & Gordon
Attorneys

Sept. 8, 1953 J. W. CARTER 2,651,443
BAG HOLDER, CARRIAGE, AND TRACK ASSEMBLY
Filed July 31, 1947 11 Sheets-Sheet 3

Inventor
Jack W. Carter
By Shrem, Crow + Gordon
Attorneys

Sept. 8, 1953 J. W. CARTER 2,651,443
BAG HOLDER, CARRIAGE, AND TRACK ASSEMBLY
Filed July 31, 1947 11 Sheets-Sheet 4

Inventor
Jack W. Carter
By
Shrevor, Crow & Gordon
Attorneys

Sept. 8, 1953          J. W. CARTER          2,651,443
BAG HOLDER, CARRIAGE, AND TRACK ASSEMBLY
Filed July 31, 1947          11 Sheets-Sheet 5

INVENTOR.
Jack W. Carter
BY
Shrevr, Crown + Gordon
Attorneys

Sept. 8, 1953     J. W. CARTER     2,651,443
BAG HOLDER, CARRIAGE, AND TRACK ASSEMBLY
Filed July 31, 1947     11 Sheets-Sheet 6
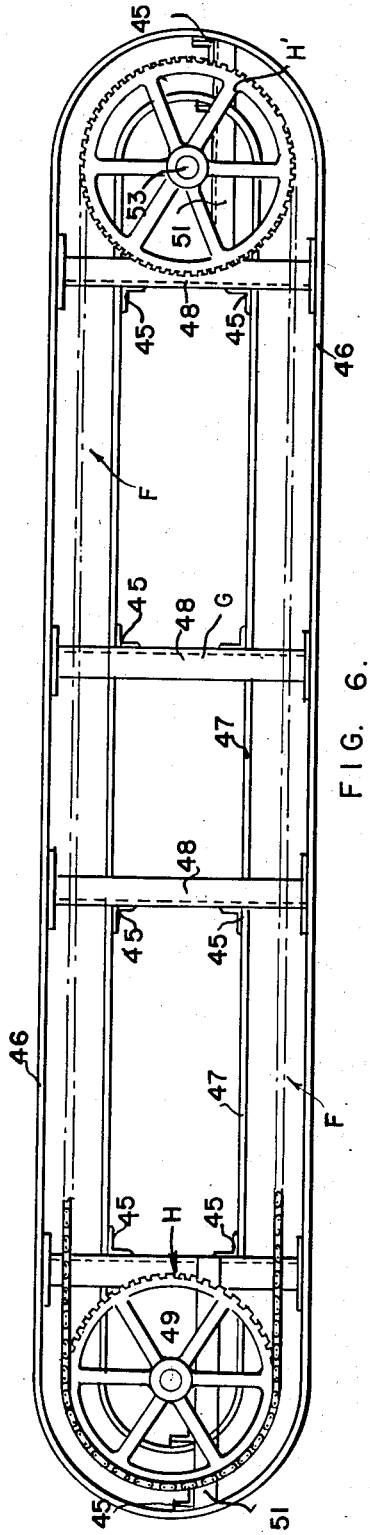
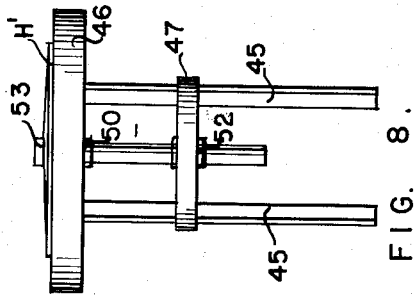
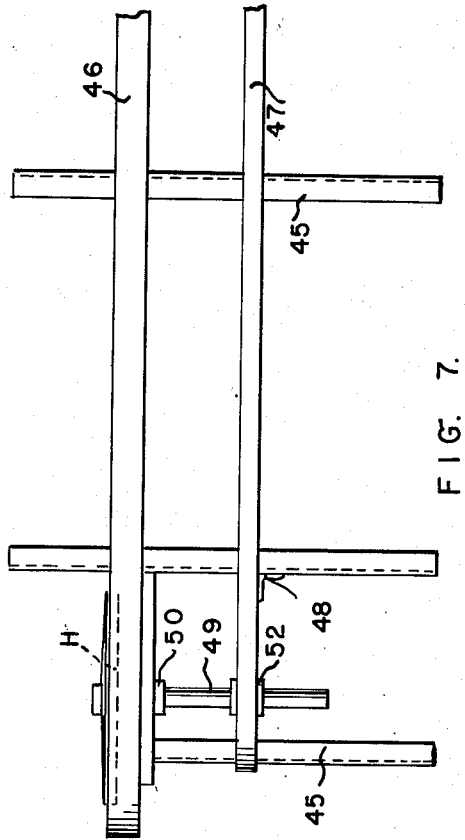
Inventor
Jack W. Carter
By Shreve, Crow & Gordon
Attorneys Sept. 8, 1953    J. W. CARTER    2,651,443
BAG HOLDER, CARRIAGE, AND TRACK ASSEMBLY
Filed July 31, 1947    11 Sheets-Sheet 7
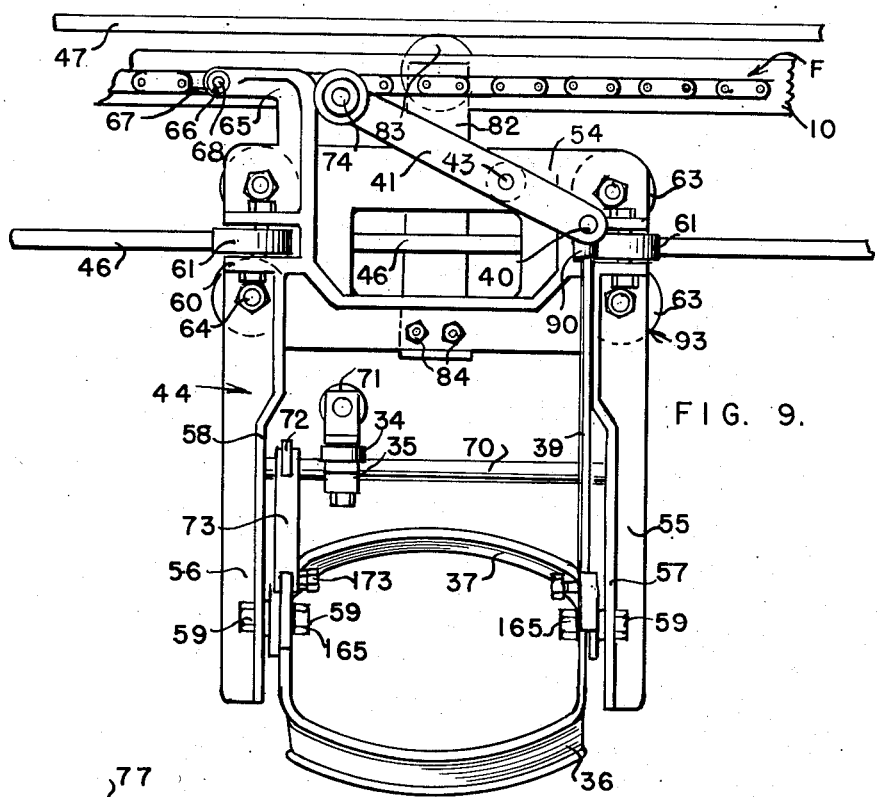
FIG. 9.
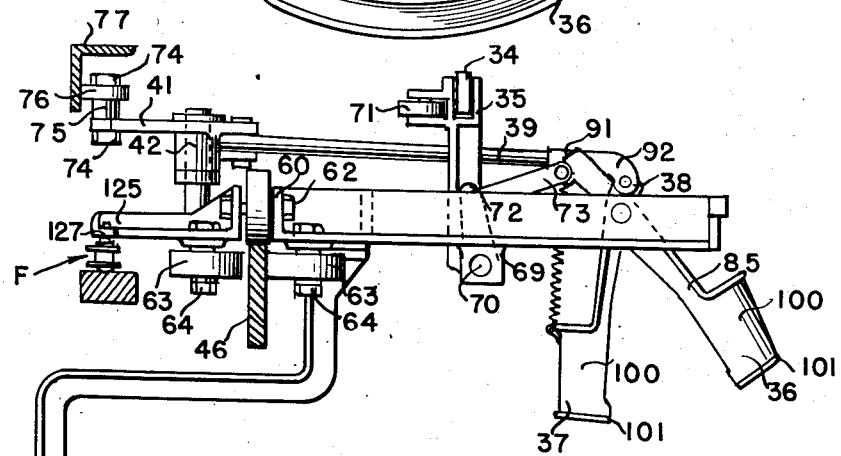
FIG. 10.
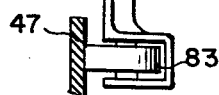
Inventor
Jack W. Carter
By Shreve, Crowe & Gordon
Attorney Sept. 8, 1953　　　　　J. W. CARTER　　　　2,651,443
BAG HOLDER, CARRIAGE, AND TRACK ASSEMBLY
Filed July 31, 1947　　　　　　　　　　　11 Sheets-Sheet 8

Inventor
Jack W. Carter
By
Shreve, Crowe + Gordon
Attorneys

Sept. 8, 1953   J. W. CARTER   2,651,443
BAG HOLDER, CARRIAGE, AND TRACK ASSEMBLY
Filed July 31, 1947   11 Sheets-Sheet 9

Inventor
Jack W. Carter

By Shreve, Crow & Gordon
Attorneys

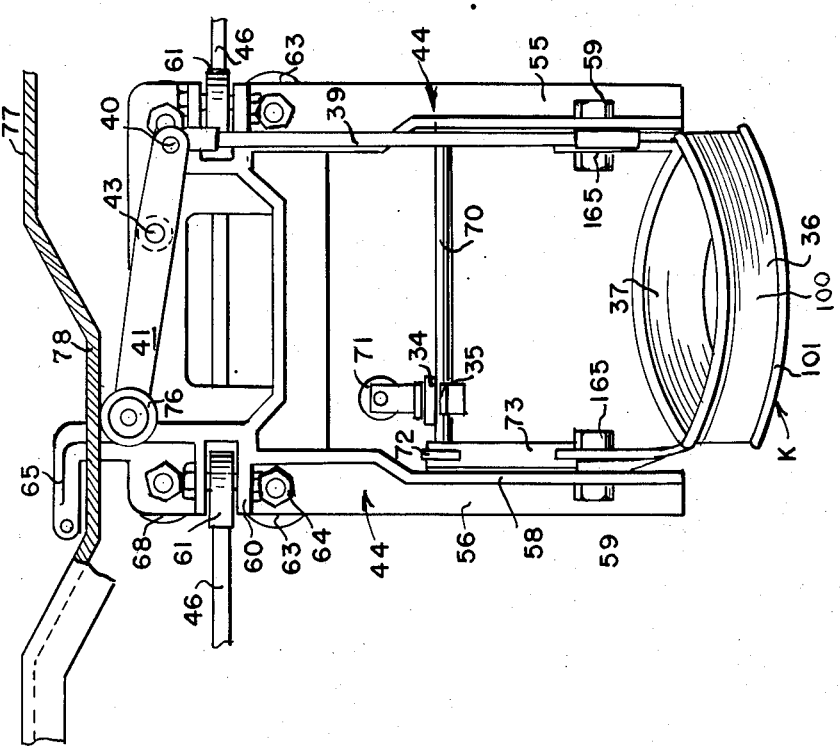
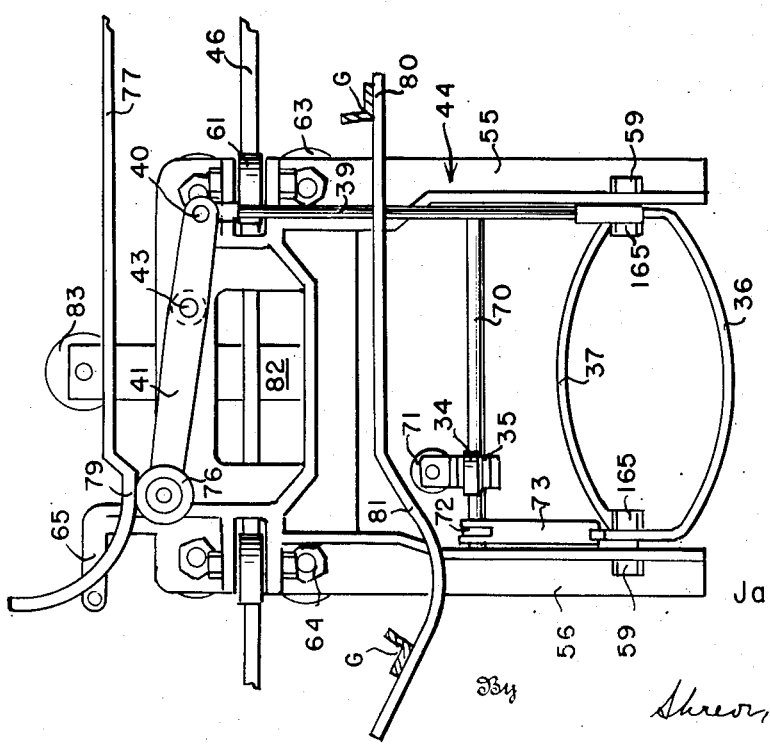

Sept. 8, 1953 J. W. CARTER 2,651,443
BAG HOLDER, CARRIAGE, AND TRACK ASSEMBLY
Filed July 31, 1947 11 Sheets-Sheet 11

Inventor
Jack W. Carter
By
Shrere, Crows & Gordon
Attorneys

Patented Sept. 8, 1953

2,651,443

UNITED STATES PATENT OFFICE 2,651,443

BAG HOLDER, CARRIAGE, AND TRACK ASSEMBLY

Jack W. Carter, Winter Haven, Fla., assignor to Fulton Bag & Cotton Mills, Atlanta, Ga., a corporation of Georgia Application July 31, 1947, Serial No. 765,136

15 Claims. (Cl. 226—18)

The present invention relates to a machine for automatically packaging food commodities, more particularly commodities such as citrus fruits that commonly are sold in the trade, packaged in bags containing a predetermined number or weight of the fruit.

In order to meet the demands of the consumer market, fruits such as oranges and the like are packaged conveniently in mesh bags which contains an accurately counted quantity of the fruit. Various mechanisms are employed for effecting counting or weighing of the fruit into bags, all of which mechanisms, however, require a considerable amount of labor, relatively large numbers of skilled operators, and the cost of the installation and maintenance of the mechanisms are comparatively high.

The present construction affords improvements in this art, in that it provides a simplified and automatic mechanism for receiving and packaging of the fruit in bags in a predetermined number for each bag, and for securing each bag securely closed after filling.

One of the principal objects of this invention is the provision of a bag holder, carriage and track assembly, including a carriage supporting track, an endless conveyor means associated therewith, a plurality of bag holder carriage elements adapted to supportingly travel on said track, each of said carriages including collapsible jaw members adapted to engage in the open mouth of a bag and expansible to supportingly carry said bag during its filling travel through the machine.

Another object of this invention is the provision of a bag filling mechanism associated with a battery of fruit or other substantially spherical object feeding elements adapted to eject one article from each of said elements as the respective bags traverse the length of said battery, said mechanism including a supporting track on which is adapted to travel a plurality of bag holding carriage elements, an endless conveyor associated with said track and connected to said carriages adapted to effect travel of the respective bags in object receiving direction relative to said elements, to receive during its travel a predetermined number of articles.

A further important object of this invention is the provision of a bag filling mechanism comprising an endless conveyor, a plurality of bag holding carriage elements connected to said conveyor, each of said carriages provided with pivotally mounted jaws, said jaws being so constructed and operable about their pivots to effect collapsing of the jaws and actuating them to a position for expeditious insertion in the mouth of an empty bag, and then substantially operable to expanding and bag holding and carrying position at a predetermined point in their travel and automatically operable to actuate the respective jaws in collapsed relation about their pivots in a direction with respect to the carriage to effect their withdrawal from the filled bag upon reaching a predetermined point in their further travel with respect to the machine.

With the foregoing objects in view, reference may be had to the accompanying drawings, which illustrate one embodiment of a machine constructed in accordance with the present invention, it being understood that the illustrated embodiment of the construction shown in the drawings is to be regarded as illustrative only, and that various modifications in the illustrated details of construction can be made without departing from the spirit of the invention. The objects of the present invention will become apparent from the foregoing description, and further additional objects will become apparent as the description proceeds; and the features of novelty will be pointed out in particularity in the appended claims.

In the accompanying drawings:

Fig. 6 is a plan view of the bag holder carriage supporting tracks and endless conveyor mechanism.

Fig. 7 is a fragmentary side elevation of Fig. 6 showing a portion of the supporting frame.

Fig. 8 is a fragmentary right hand end elevation of Fig. 6 showing the supporting frame.

Fig. 9 is a plan view of the bag holder carriage and associated parts.

Fig. 10 is a side elevation of the construction shown in Fig. 9.

Fig. 15 is a sectional plan view showing the cam arm in engagement with the cam, with the jaws in bag receiving position.

Fig. 16 is a top plan view with the cam arms of the respective jaws in cam engaging and partial engagement with their respective cams for operating the jaws in course of their withdrawal from the bags.

Fig. 17 is a diagrammatic view of the driving mechanism.

Figure 1:
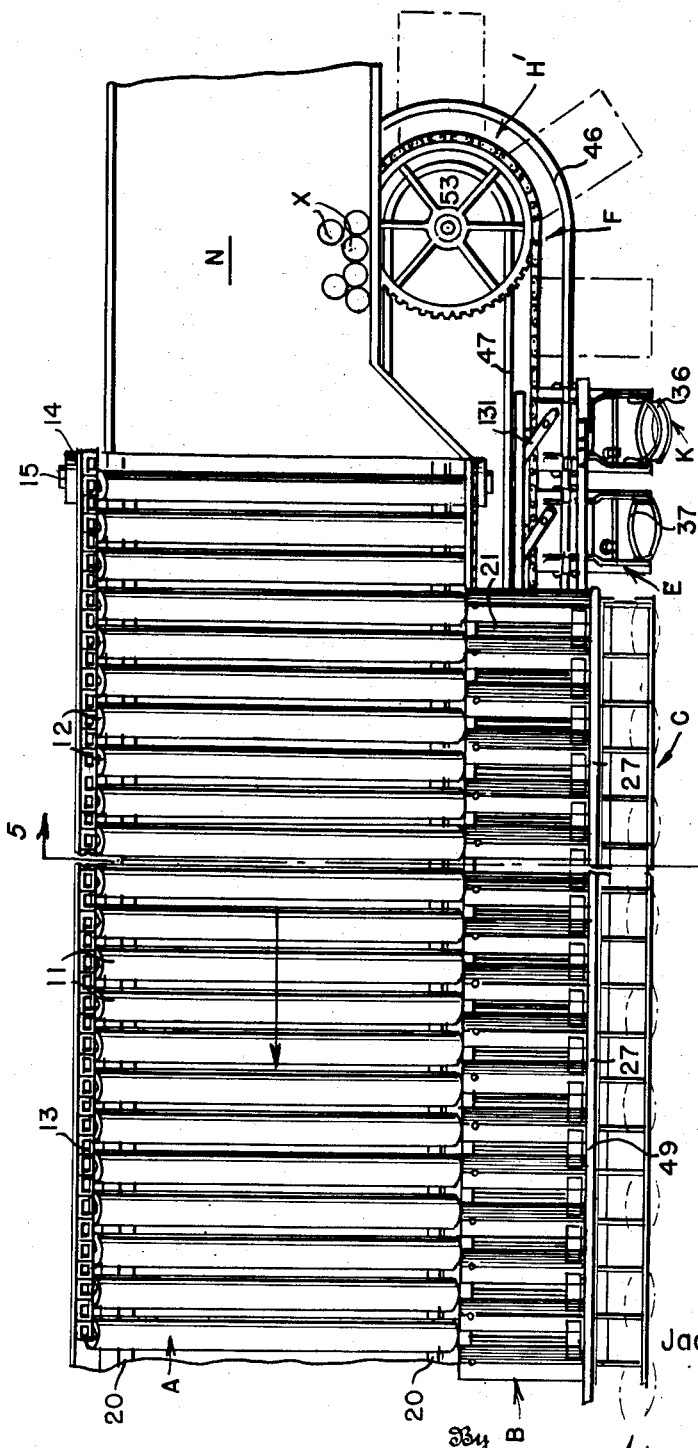
Fig. 1 represents a fragmentary plan view of one portion of the machine constructed in accordance with the present invention.

The machine of the present construction comprises three units which may be referred to as (one) the distributor and feeding mechanism, (two) the bag holders, carriage and track mechanism or assembly, and (three) the filled bag closure and delivery unit.

Generally speaking, the distributor unit consists of rolls mounted on two endless chains to form a conveyor. Two wooden strips under the rolls, one near each end, support the weight of the rolls and cause them to rotate as they are pulled along by the chains. The material composing the rolls, and the dimensions of the said rolls are not critical and depend upon the particular size and the capacity of the installation. The weight of the return, or lower side of the distributor, is carried directly by the chains, which slide in steel angles which form a part of the frame.

The entire distributor assembly is sloped sideways toward the front of the machine at an angle somewhat greater than the angle of repose of the fruit being handled, for example, an angle of approximately six degrees to the horizontal. This angle of slope however is not critical, but should be sufficient to maintain the fruit gravitationally rotating constantly by the rotation of the rolls during their travel in distributing direction and maintain the fruit crowding down to the front side of the machine to discharge chutes which direct the fruit to the bags. The counting is done by lifting one piece of fruit from each chute in succession as the bag carrier moves along under the chutes, the number of which correspond to the number of objects desired to be contained in the bag. The chutes which are not being used are closed by a bar or other suitable closing means disposed across the upper ends of the chutes. It will be apparent that the number of chutes can be varied to suit conditions in accordance with the desired capacity of the machine.

Preferably the chutes are formed of triangular shaped wooden strips, in the present instance, two and three-fourths inches wide by one and one-fourth inches thick, arranged parallel on four inch centers. Elevating ejector rods or levers are pivoted at their upper ends on a rod which runs the length of the chute assembly. Ejector cam arms are connected to the ejector rods by rods with ball and socket end connections for engagement by cam arms passing thereunder.

Fruit on the distributor in excess of that amount required to fill the chute spills over at the end into an inclined trough and rolls to an elevator to be carried up again to the entering end of the distributor for recirculation by suitable means mounted along the rear side of the machine (not shown).

The bag holders, carriage and track assembly, includes a plurality of bag holders. Each bag holder includes a mouthpiece constructed of two similar halves, constituting the jaws, pivotally mounted so that they can swing together to form a smooth solid approximately elliptical shape to facilitate putting on the empty bags at a high rate of speed. Also the jaws of each bag holder swing up toward an operator while they are closing, so that the bags may be mounted on the holder with a minimum of effort by the operator. When the jaws of each holder are allowed to open after the bag is placed on the holder a spring at each end holds the jaws apart and keeps them expanded in the mouth of the bag. A raised lip or bead around the lower edge of each mouthpiece or jaw projects into the open mesh-portion of the bag fabric just below the closely woven selvege top, and prevents the bag from slipping down under the weight of the fruit.

When the bag is on the mouthpiece the jaws are spread apart by the action of the tension springs and stand approximately vertical, forming a guide for the fruit dropping into the bag as well as gripping the mouth of the bag due to the projecting bead around their lower edges. The mouthpiece is automatically adjustable to hold bags of different circumferences, for example, eight pound and ten pound bags. Collapsing the mouthpiece jaws to receive an empty bag is accomplished as follows:

As each bag holder carriage continues it travel a cam formed on the forward portion of a cam track member, the latter extending the length of the chute assembly, engages a cam lever arm on the carriage, and through a connecting link causes the rear half of the mouthpiece to rotate about its pivot, which is common to both halves, the front half being connected to the rear through said springs, and also rotates around said common pivot until it strikes the stop, which stop is fixed to the frame of the carriage. The rotation of the rear half of the holder continues after the front half has been stopped, until the mouthpiece halves or jaws are brought together or collapsed, the springs then being extended, and during the interval of engagement of said lever arm with said cam an empty bag is placed on the holder, and passage of the lever from the cam releases the main half, allowing the springs to expand the jaws in the bag and hold them there under tension, and at the same time causing the mouthpiece to continue to move back and downwardly to a vertical expanded position to receive the fruit.

A lever arm carrying two cam rollers, one mounted to rotate in a vertical plane and the other in a horizontal plane, is connected to the front jaw by a link, and when said empty bag is in place with the two jaws standing approximately vertical as previously described, said lever also stands vertically, and as the respective carriages move along the feed chutes the cam arms connected to the fruit elevating ejector lifters are engaged by the vertical cam roller and raised in succession to lift and eject one piece of fruit from each chute. When there is no bag on a holder, the front jaw is pulled forwardly to a relaxed position by the springs, causing the lifting or ejecting cam lever to swing to the rear. In this position, as the carriage moves along the track under the feed chutes, the cam lever passes behind the ejector cam arms and no fruit is discharged.

At the end of the fruit assembly where the filled bags are released to the conveyor of the bag closure unit, there are two cams which act simultaneously on the cam arms of the bag holder carriages previously described. One cam is formed on or affixed to the rear end portion of a short cam track extending parallel to said first mentioned cam track, and the other formed on or affixed to the rear end portion of said first mentioned track. The short track cam operating on the horizontally mounted roller on the cam lever arm that engages the fruit ejector cam arms causing the front jaw to be held, through the connecting link against the pull of the jaw springs. At the same time, the rear cam on the first mentioned cam track causes the rear jaw to move forwardly and collapse against the front jaw and release the top of the filled bag. The jaws are held in such collapsed position and rotated upward and outward to lift out of the bag's mouth. This action is the reverse of the action at the empty bag loading station, with the exception that the additional cam action of the horizontal roller of the lever connected to the front jaw is necessary.

Limit switches of a sensitive type, actuated by small feeler wires or levers, may be applied to the last two or three chutes in the line in order to have means of stopping the bag carriers if an insufficient supply of fruit is coming to the distributor. This, is an optional provision, and is not a required part of the equipment.

The filled bag closing and delivery unit closes the filled bags by sewing. The bags when filled are delivered to the sewing machine, the sewing head of which is mounted on a bracket which can be raised or lowered by a screw on the supporting column to adjust the height of the seam with relation to the top of the bag. Fixed to the same bracket which carries the sewing head are arms which carry small endless chains or belts which come together at the center lines of the conveyors and pass through the sewing head just above the needle and which structure is adjustable as a unit with said bracket. The purpose of these chains, belts, or the like is to hold the mouth of the bag in a closed position in a straight line and deliver to the feed dogs of the sewing head. An operator may be stationed at the point of entry of the bag mouth into these gripper chains or belts, to insert the bag mouth into them in the correct position and alignment should it become necessary.

The lower part of the bag, and the weight of fruit or other contents, are supported by three endless conveyors, the horizontal or bottom one of which include endless chains on which are mounted slats or the like of suitable material. The two vertical conveyors adapted to grip the opposite sides of the filled bags have mounted on their respective upper and lower chains, an endless series of rectangular hollow box-like elements in which are detachably mounted and suitably secured resilient filled bag engaging members of spong rubber or the like of a length substantially that of said bags, so as to afford an uninterrupted grip throughout the length of resilient members and the major portion of the bag to firmly support the fruit contents of the bag without bruising or damage thereto. All three conveyors together with the two small belts or chains which hold the bag mouth, are driven at the same speed by means of shafts at the discharge ends, which are geared together. The chain of sewing thread between the bags is cut by a spring mounted knife mechanism automatically controlled by each bag as it passes from the sewing head.

The machine is driven by an electric motor preferably mounted beneath the rear end of the distributor conveyor mechanism and adjacent the filled bag closing and delivery unit. Said motor is adapted to drive a motor shaft extending rearwardly to the end of said bag closing unit to a gear box from which motive power is supplied to the rear shaft of the bottom filled bag conveyor and through gear connections to the rear vertical shafts of the adjacent vertical conveyors, these vertical shafts also driving the bag mouth engaging chains or belts. A pulley mounted on said motor shaft is adapted to drive the sewing head through a suitably operable friction clutch by means of a belt.

A shaft extending from the opposite side of said motor has driving connections with a gear box having driving connections with the shaft of the drive sprocket for the conveyor chain attached to the bag holder carriages. Said shaft also has driving connection with a drive pulley or sprocket mounted on the rear shaft of the distributor roller conveyor adapted to initially receive the fruit for distribution and packaging.

As has been pointed out above, the mechanism of the present invention embraces three main units, or divisions, which are intended to be used in various combinations, either with themselves, or with other mechanisms or devices, for packaging objects such as oranges or other citrus fruits, or similar articles, into bags or other similar containers made of flexible materials.

With regard to citrus fruits, it is desired to pack in consumer size bags (for purposes of description 8 pounds and 10 pounds) by automatic machinery with a reduction of effort and expense on the part of the grower or shipper, and at the same time assure the consumer of receiving full count by eliminating chances of human error in the count when fruit is packed by hand in consumer size bags, and also to eliminate the chance of contents being lost or removed from the bag during handling by having the packages sealed at the point of origin.

The distributing and feeding mechanism is described and claimed in greater detail in my co-pending application, Serial No. 765,135, filed July 31, 1947, now Patent No. 2,625,255. The bag closing and delivery unit is described and claimed in greater detail in my co-pending application, Serial No. 765,137, filed July 31, 1947.

Having thus briefly described the three units constituting the complete machine, the second, or, bag holders, carriage and track assembly, forming the subject matter of the instant application, will now be described in detail.

Referring more particularly to the drawings, A represents a conveyor (Figs. 1, 2, 3 and 4) which is adapted to receive the fruit X to be packaged, the conveyor A distributing and delivering the fruit to the chute means B for feeding the fruit to hopper chutes C responsively to registration of each bag D of the series of bags with the respective chutes C, one orange or similar fruit being dropped into each bag whenever the bag comes into register with each of the successive chutes C, so that by the time each bag has been passed beneath all of the chutes of the series the predetermined count of the fruit has been introduced into each bag. The bags D are mounted on bag-holding carriages E that are carried by endless conveyor means F, supported on track 10 suitably mounted on frame G, and actuated by end sprockets H and H', one of which, sprocket H is driven, and the other sprocket H' being an idler sprocket.

Figure 2:
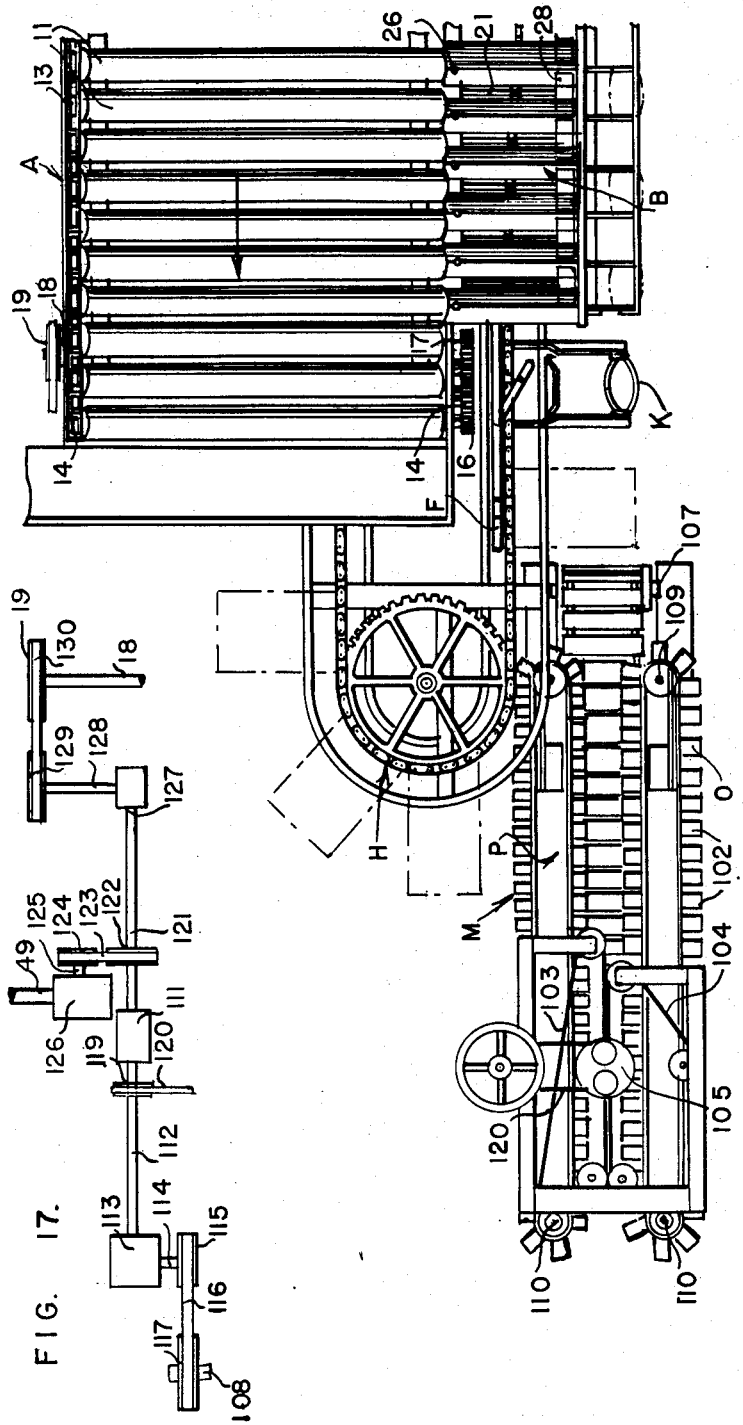
Fig. 2 is a continuation of Fig. 1 showing a fragmentary plan view of the remainder of the machine.
Figure 3:
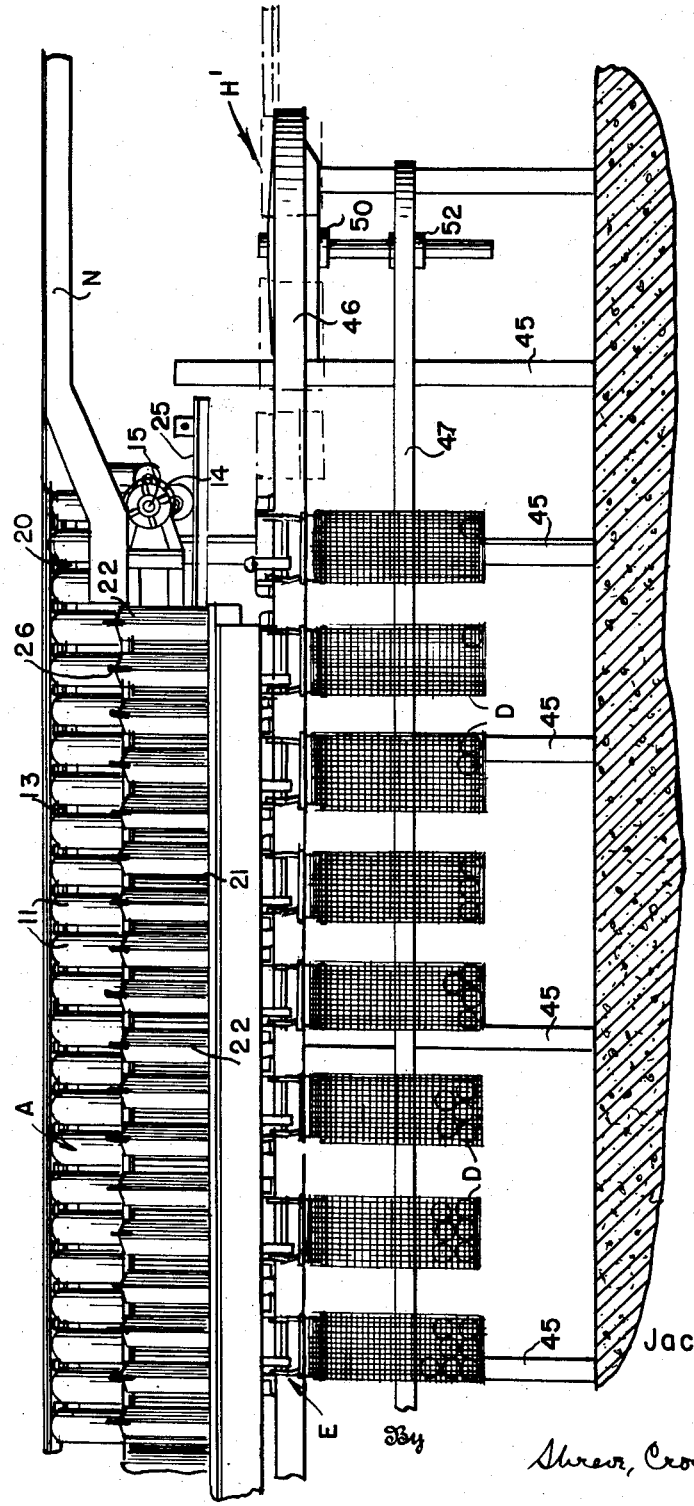
Fig. 3 is a fragmentary side elevation of the portion of the machine shown in Fig. 1, the view showing a series of bags mounted upon the bag holders.
Figure 4:
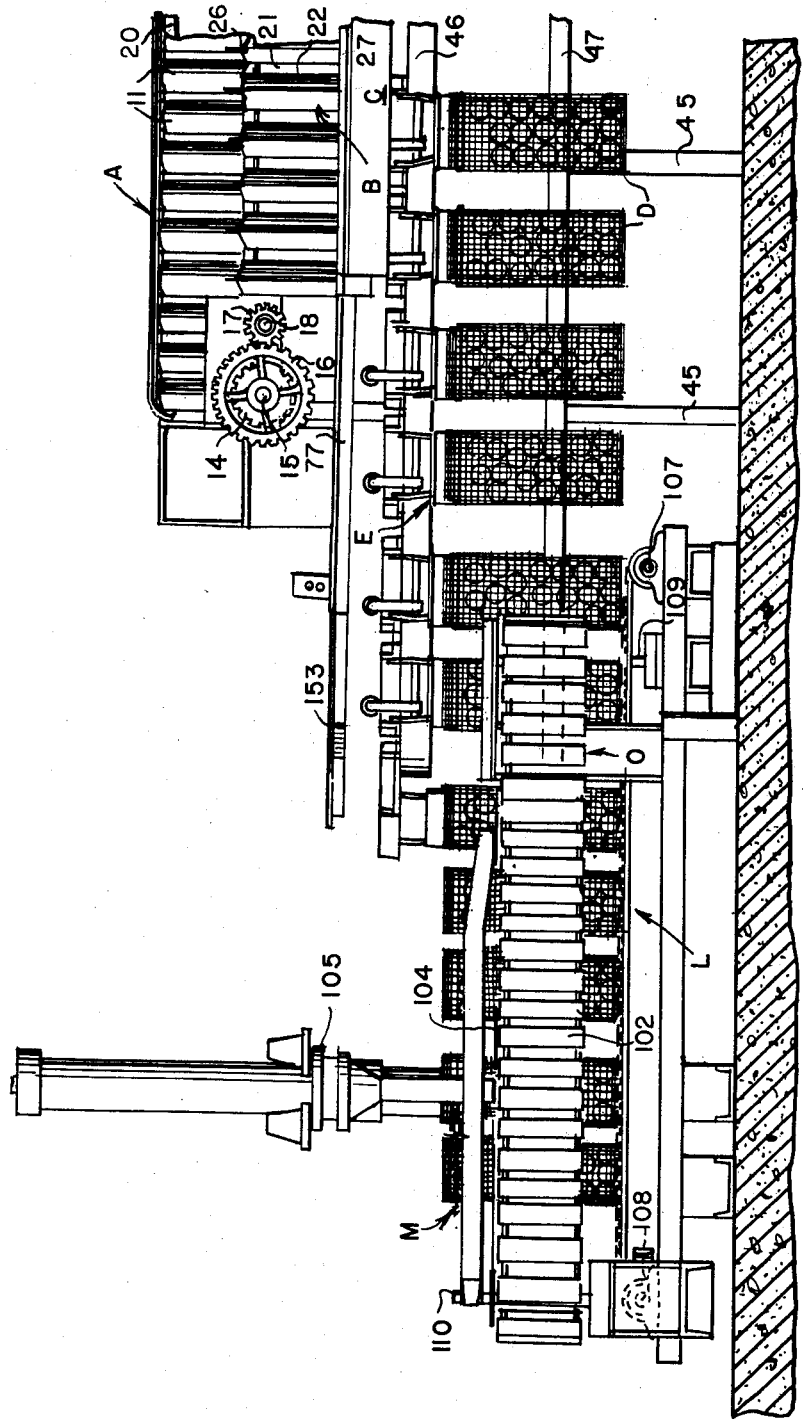
Fig. 4 is a side elevation of the opposite end of the machine, the view being a continuation of Fig. 3, and showing filled bags being transferred to the bag closure unit.
Figure 5:
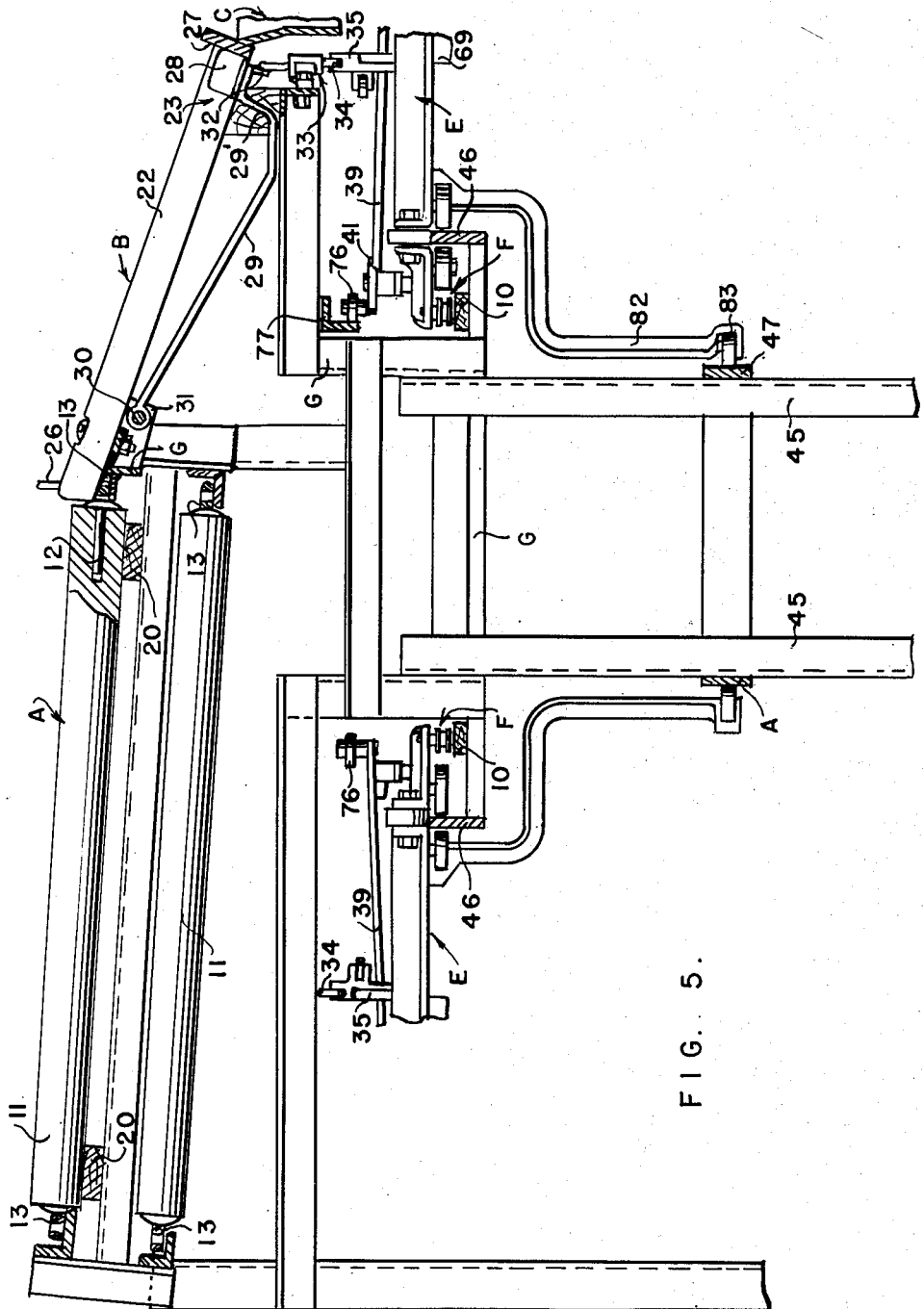
Fig. 5 is a sectional elevation taken along the line 5—5 of Fig. 1.
Figure 11:
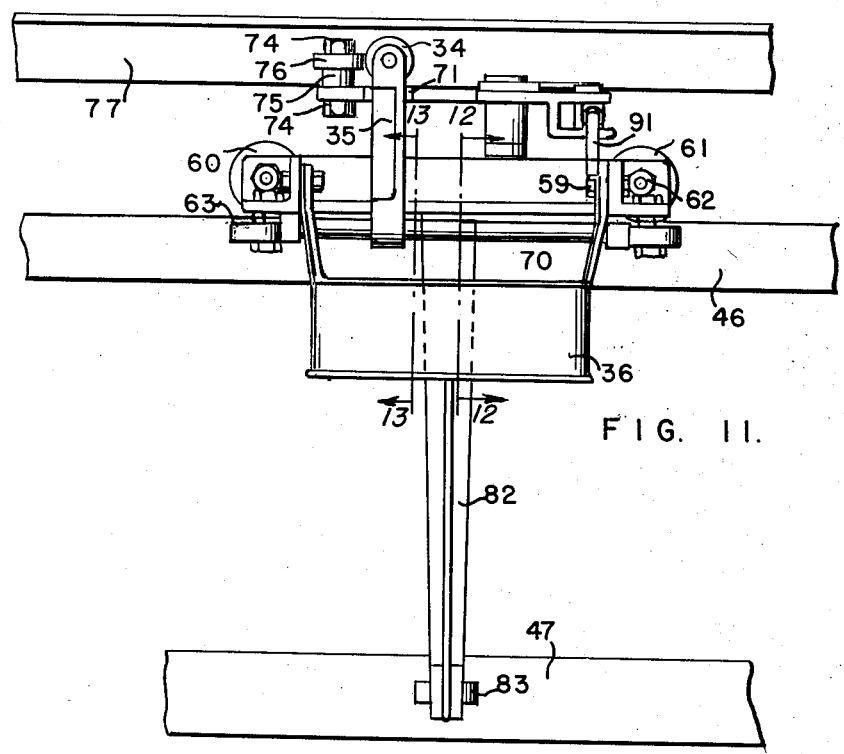
Fig. 11 is a front elevation of the construction shown in Fig. 10.

Distributing conveyor A is shown as being composed of rolls 11 that are rotatably mounted at each end on pintles 12 (Fig. 5) that project therein from endless conveyor chains 13 to which they are attached. Conveyor chains 13 pass over pairs of end sprocket wheels 14 mounted on shafts 15, respectively, the sprocket wheels 14 on the rear shaft 15 being driven through said shaft, gear wheel 16, pinion wheel 17 mounted on drive shaft 18 and pulley 19 on the opposite end of said shaft (Fig. 2). As the conveyor chains 13 are operated the movement thereof in article-distributing direction causes the rollers 11 to be rotated by the supporting strips 20 (Fig. 5). As will be seen from the drawings (Fig. 5), the conveyor rolls 11 are inclined to the horizontal at an angle somewhat greater than the angle of repose of the fruit carried thereby, so that the fruit which is distributed over the conveyor A will roll down into the chutes or troughs 21 between and formed by the triangular block strips 22 so that the lowermost fruit therein can be delivered one at a time to a respective hopper chute C and thence into the bags D as each successive bag moves into register with each of the chutes C. An ejector mechanism 23 is provided in each of the chutes 21 for ejecting the lowermost fruit as each bag moves into filling position.

The chutes C are mounted on bracket arms 24 carried by angle bar 25 of the frame G. The triangular block strips 22 defining the chutes 21 are provided with upstanding retaining guides 26 (Fig. 4) at their upper ends intermediate adjacent chutes to prevent any overflow of the fruit or articles from accumulating on said strips. The feeding column of fruit is retained in the chutes 21 by an end member 27 secured to said block strips and closing the lower ends of said chutes 21. Said troughs or chutes are of such shape that the fruit is aligned therein in columns. The discharge of each item of the fruit or articles is effected by said ejector mechanism 23 which comprises a vertically operable ejector member 28 in the lower end of each of the chutes 21 mounted on an ejector rod arm 29 formed with a seat-shoulder 29' for retaining the remaining fruit against movement during the ejecting operation; said rod 29 being pivotally mounted on horizontal rod 30 mounted in brackets 31 carried by frame member G. The outer end of each rod 29 is connected as at 32 to a cam mechanism 33 adapted to be engaged by a cam roller 34 mounted on cam arm 35 carried by each bag holding carriage E, to elevate the ejector 28 with the article to be ejected thereon as the carriage passes thereunder, the article rolling over end member 27 through a respective chute C and into the bag carried by said carriage, as more specifically described and claimed in my co-pending application, Serial No. 765,135, filed July 31, 1947, now Patent No. 2,625,255, Distributing and Feeding Mechanism.

Each bag D is held on a holder or mouthpiece K comprising cooperating jaws 36 and 37. Jaw 37 is pivotally connected as at 38 (Fig. 10) to rod 39 which is pivotally connected as at 40 to cam lever arm 41 formed spaced from its connection 40 with a depending hub 42 pivotally mounted on upstanding pin 43 formed on or attached to the carriage or bag holder frame 44, said frame being connected to conveyor F and carried along by said conveyor. Details of the bag-holding instrumentalities are shown in Figs. 9 to 16, inclusive.

As shown in Figs. 6, 7 and 8, the conveyor F is an endless chain passing around drive sprocket H and idler sprocket H' mounted on frame G. Said frame G comprises an ovally arranged series of vertical angle iron members 45, said members being encircled by upper and lower bag holder carriage track members 46 and 47, respectively, which are suitably attached to said members 45 by welding or bolting thereto, and which additionally serve as frame members interconnecting the members 45. Also suitably attached to the frame standards 45 are the cross angle bars 48. Drive sprocket H is mounted on the upper end of drive shaft 49 journaled in upper bearing 50 suitably anchored to said angle bar 51. Secured similar to cross bars 48 to the end standards 45 to which the track 47 is attached, the other end of angle member 51 is secured to cross bar 48. Drive shaft 49 is also journaled in lower bearing 52 supported similar to bearing 50 or in any suitable manner. Said idler sprocket H' is mounted on stub shaft 53 and supported on angle bar 51, and is journaled in bearings 50 and 52 similar to shaft 49.

The bag holder frame 44 of the carriage assembly E is in the form of a casting comprising a base mounting plate 54 from which extend the integral spaced parallel angle bar arms 55 and 56, and in the upstanding webs 57 and 58 of which, jaws 36 and 37 are pivotally mounted on the bolts 59. Said base plate 54 is formed with oppositely disposed mountings or upstanding webs 60 for the vertical rollers 61 mounted on shaft bolts 62, and which rollers run on the upper edge of the upper endless track 46. The cooperating horizontal guide rollers 63 adapted to engage the sides of the track 46 are mounted on stub shafts or bolts 64.

The base mounting plate 54 is formed with an integral rearwardly extending right angle arm 65, which is pivotally connected as at 66 to a bracket or link 67 pivotally connected to the endless conveyor chain F by a link pin 68, or if desired said arm may be connected directly to pin 68 or to said chain in any suitable manner (Fig. 9).

The angle bar arms 55 and 56 are formed with depending lugs 69 in which is journaled a rocker bar or rod 70 on which is suitably mounted the upstanding cam arm 35 having mounted in its free end the vertical cam roller 34, and on its rear side adjacent to said roller 34 and at right angles thereto is mounted the horizontal roller 71 for a purpose hereinafter described. Mounted on rocker bar 70 is an upstanding lever arm 72 pivotally connected to the rearwardly extending portion of the front jaw 36 by link 73, by means of which construction, operative movement of said jaw is effected by the cam action of the horizontal roller 71 (Fig. 16), as will directly more fully appear.

Mounted on the free end of cam lever arm 41 is an upstanding stub shaft 74, on the upper end of which and on the fixed spacer 75 is mounted cam roller 76, which engages the cam bar 77 suitably mounted on frame G (Fig. 5) which extends substantially the length of the bag filling portion of the machine shown in Figs. 1 and 2. This cam bar 77 includes two cams, the one designated at 78 (Fig. 15) is adjacent to the right hand (loading) end of the machine, as viewed in Figs. 1 and 3, and the second cam indicated at 79 (Fig. 16) is adjacent to and beyond the left hand end of the bag filling portion of the machine as viewed in Figs. 1 and 2. Said cams are adapted to be engaged by cam 76. Also, adjacent to the left hand end of said forward portion of the machine there is mounted on the frame a relatively short cam bar 80, parallel to and horizontally spaced from the cam bar 77, including cam 81 in alignment with cam 79 on bar 77, and adapted to be engaged by the horizontal roller 71 of the cam arm 35 (Fig. 16). The shape of these cams is shown in Figs. 15 and 16, and their function will be pointed out in greater detail hereinafter.

The entire carriage assembly E for carrying the jaws 36 and 37 is supportingly mounted on the endless track 46 and, in order to support and effect easy running of said carriage when carrying a filled bag, there is a downwardly, inwardly and downwardly extending bracing arm 82 on the lower end of which is mounted a roller 83 adapted to engage lower endless track 47. Said arm is attached to the base plate 54 of holder frame 44 by bolts 84 (Fig. 9).

Figure 12:
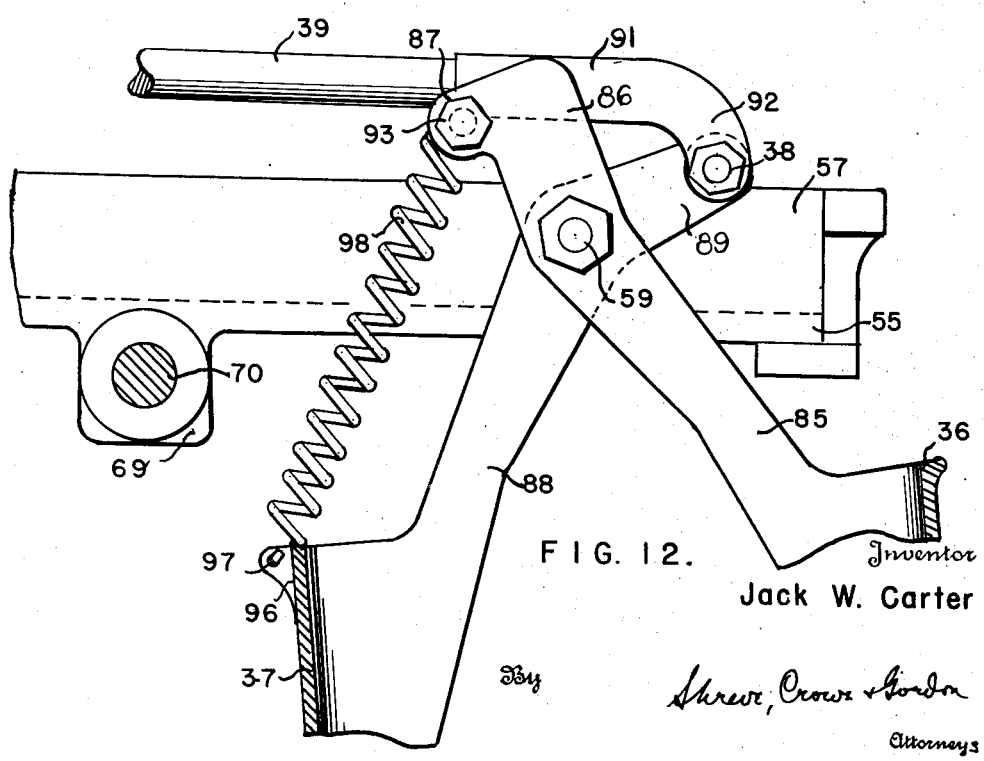
Fig. 12 is a sectional elevation taken along the line 12—12 of Fig. 11.
Figure 13:
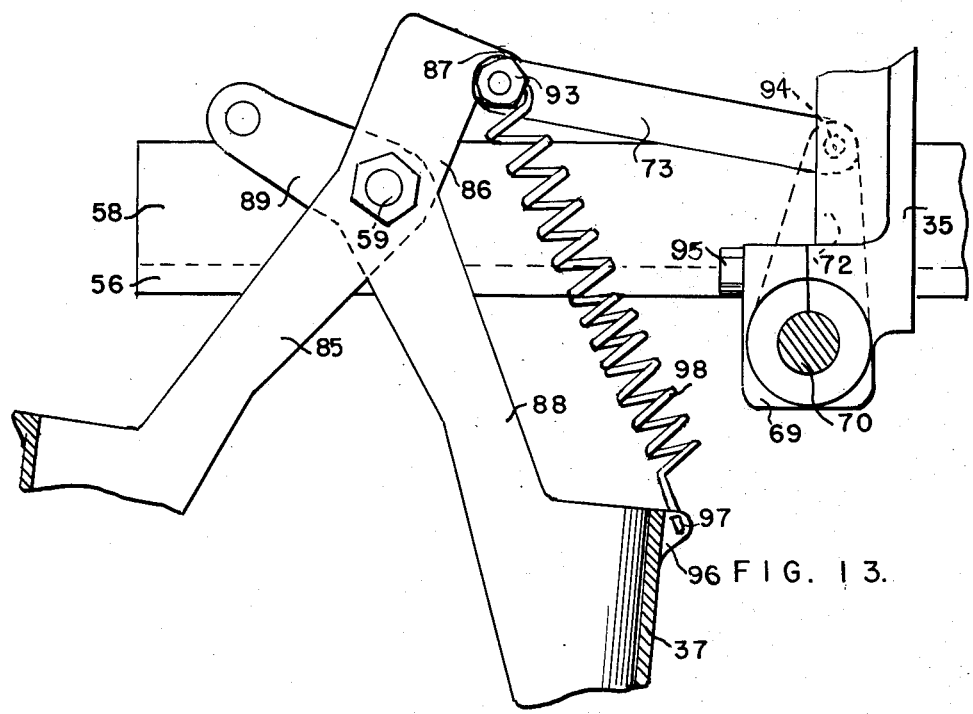
Fig. 13 is a sectional elevation taken along the line 13—13 of Fig. 11.
Figure 14:
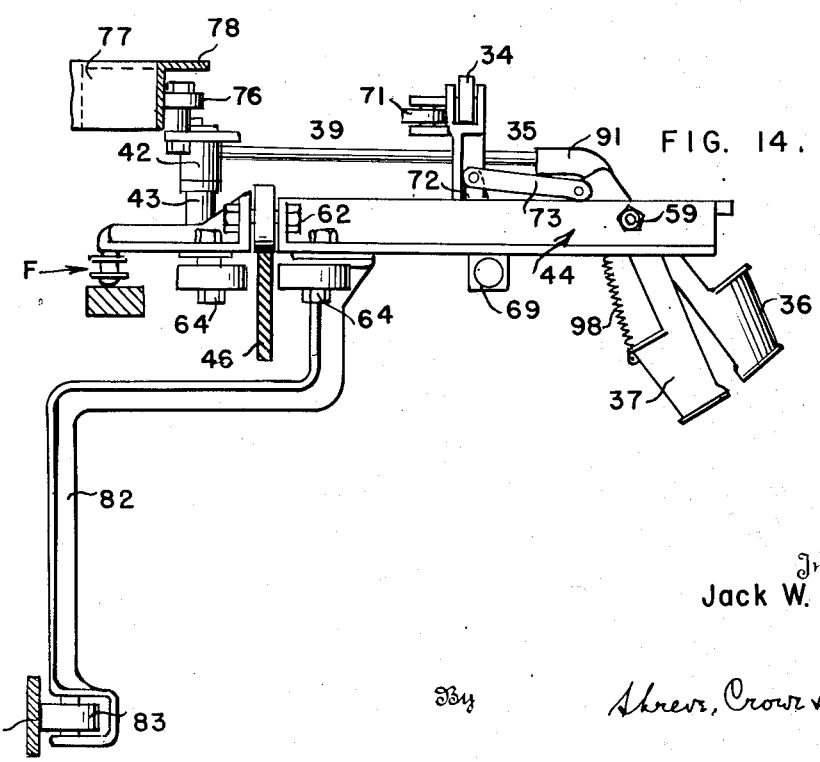
Fig. 14 is a sectional elevation similar to Fig. 10 but showing the bag carrying jaws in position to receive a bag.

With further reference to the jaws 36 and 37, jaw 36 is formed with a pair of bell-crank arms 85 having portions 86 extending upwardly at angles therefrom and formed with rearwardly extending lug portions 87 (Figs. 12 and 13), and the rear jaw 37 is formed with a pair of bell-crank arms 88 pivotally connected to jaws 85 by bolts 59 and formed with the outwardly extending angle portions 89. Rod 39 is threadedly connected at one end of a sleeve connection 90 (Fig. 9) and at its outer end similarly to a sleeve connection 91, the free downwardly curved end 92 of which, is pivotally connected by a pin or bolt 38 to one of the arms 88 of jaw 37 (Fig. 12). The arm 85 at the opposite side of the jaws is connected to one end of link 73 by bolt 93, the other end of said link being connected to lever arm 72 by a bolt or pin 94.

Said lever arm 72 is suitably secured on the shaft 70 and cam arm 35 is locked on said shaft by a bolt 95. The rear jaw 37 is formed at each side with an integral ear 96, said ears being connected as at 97 to coil springs 98, the other ends of said springs being connected to the lug extensions 87 of the front arms 85 by bolts 93. These coil springs act to urge said jaws 36 and 37 in separating direction, and are adapted, when said jaws are collapsed and inserted in the mouth of a bag D, to automatically expand and retain said bag thereon, upon release of the jaw collapsing cam action of cam 78 as cam roller 76 is disengaged therefrom.

The action of the cams will now be described. It will be understood that the jaws and supporting carriage structure E therefor, as described above, will be multiplied as many times as may be desired, there may be as many of the bag holders K as there are troughs 21, so that each bag will receive an orange or similar fruit from each trough or chute as it comes into registration with each succeeding hopper chute C, so that at the end of its passage with respect to the series of chutes or troughs 21, it will have received a predetermined count of fruit therein, and is delivered from the filling unit to the sewing unit for sewing the bags to close them. The cams 79 and 81 referred to and above described effect positioning of the jaws to facilitate application of the bags to the jaw holders and effect their removal from the filled bags.

Figure 18:
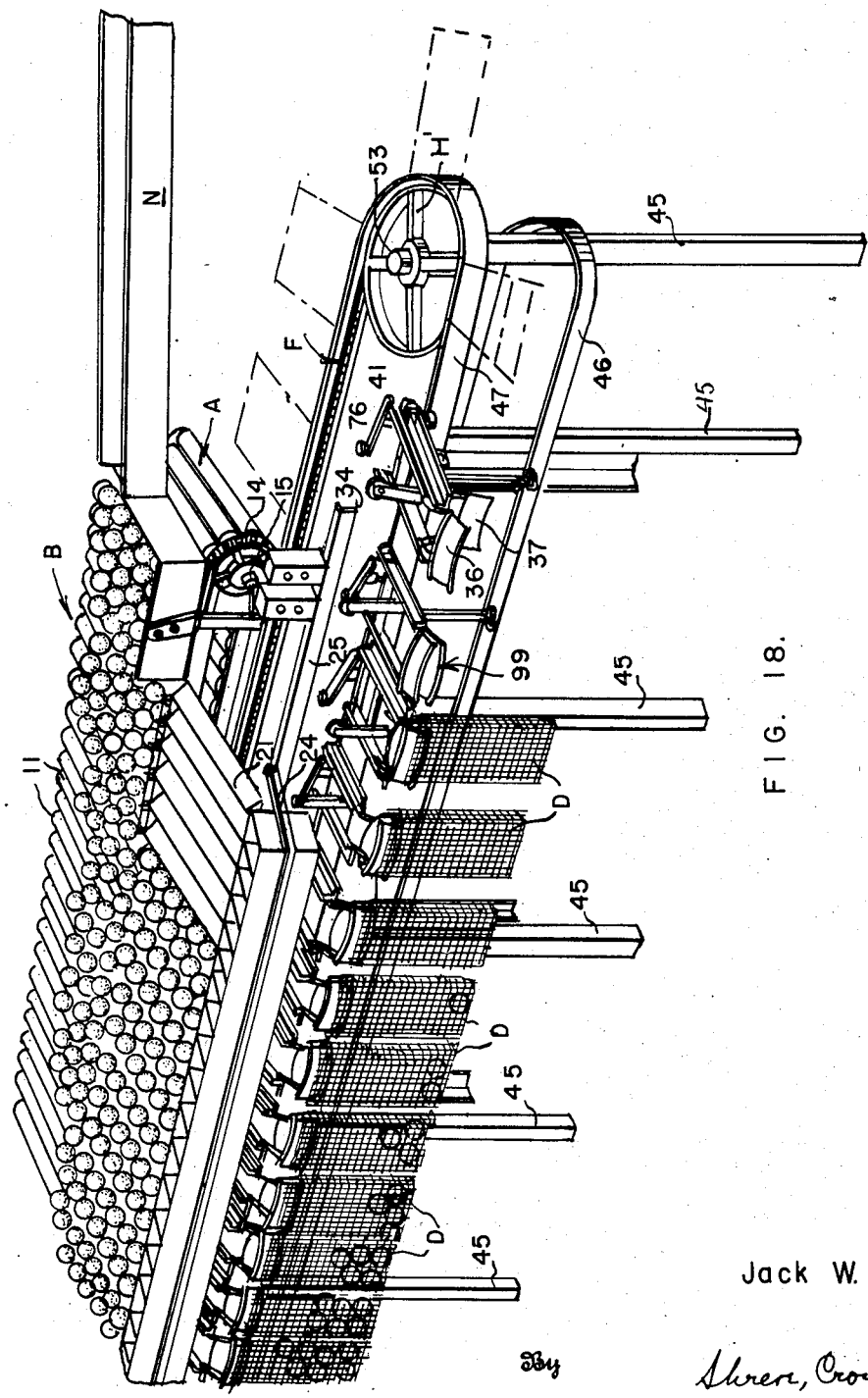
Fig. 18 is a perspective view of the end of the machine shown in Figs. 1 and 3.

As roller 76 engages cam 78 at the loading end of the machine the arm 41 actuates bar 39 to close the jaws 36 and 37 and to tilt or position them as indicated at 99 (Fig. 18), which enables a bag D to be slipped over the jaws while roller 76 is in engagement with said cam 78 and as the roller passes from the cam, the springs 98 open the jaws to hold the bag thereon in mouth expanded position. As the bag passes beneath the successive chutes 21, cam roller 34 associated with the jaw carriage causes ejector mechanism 23 to eject the lowermost fruit from each chute which drops into the open bag as it passes beneath the successive chutes C. As the carriage means moves adjacent to the discharge end of the distributing and filling unit, roller 76 engages the second cam 79 in the cam bar 77, and simultaneously cam roller 71 engages the cam 81 in the cam bar 80 which extends only a relatively short distance along the frame adjacent the end of the filling unit.

The cams 79 and 81 act together to close the jaws 36 and 37 to permit the removal of the successive filled bags therefrom in vertical position, thereby enabling them to be positioned and retained in vertical position on the horizontal conveyor L of the bag closure unit M (Figs. 2 and 4) for delivery thereto.

It will be observed that each of the complemental jaws 36 and 37 are pivoted together as is indicated at 59, and when closed to receive the bags they form a smooth solid shape or mouthpiece approximately in configuration, each of said jaws are provided with lip portions 100 formed around their lower edges with protecting bead portions 101 for retaining the bags from slipping under the weight of the fruit, and which construction in conjunction with the resilient spring means 98 enables bags of different sizes to be handled on the same jaw equipment without requiring manual or other added adjustment.

In operating the mechanism of the invention, the fruit to be packaged is discharged from a suitable supply such as a delivery trough N (Fig. 18) onto the distributing conveyor A, the rollers 11 of which are rotating and distributing the fruit uniformly thereover, said fruit rolling down by gravity into the troughs 21, in which the fruit becomes aligned, and in the lower end of which are positioned the ejector mechanisms 23, connected to their operating cam mechanisms 33, each of which is successively operated by each cam roller 34 of its cam arm 35 on bag holder carriage E to eject the lowermost fruit into bag D carried thereby as it comes into register with a chute C underlying the ejector mechanism.

When the conveyor chain F is in operation and as the bag carrying instrumentalities E are brought into position for the bags to be placed on the successive pairs of jaws 36 and 37, each pair is tilted and closed by the action of the cam 78 on cam roller 76 of the bag holder frame 44, and during the period of their engagement a bag D is placed over the jaws, and as the bag holder cam 76 passes from the cam 78, springs 98 open the jaws within the mouth of the bag and said jaws with the bag thereon are shifted to vertical position about their pivots 59 and are in filling position.

During the forward travel of the bag holding carriages E, each of their rollers 34 engages a respective cam mechanism 23 to effect the discharge of a single fruit into the bag as it passes thereunder. This action is repeated for each bag, and when the cam rollers 34 and 71 of each of the bag carrying instrumentalities reaches the cams 79 and 81 near the discharge end of the machine, the holding jaws 36 and 37 are again compressed and withdrawn from the bags and the filled bags are delivered to the conveyor L of the filled bag closing and delivery unit M, which latter is described and claimed in detail in my co-pending application, Serial No. 765,137, filed July 31, 1947.

In the event there is no bag on the holding jaws 36 and 37, springs 98 after passing cam 78 maintain the jaws forwardly to relaxed open position, thus causing the bracket cam or arm 35 mounted on the rocker shaft 70 to be moved rearwardly through action of the link 73, thereby causing said cam arm 35 and roller 34 to pass behind the mechanisms 33 and no fruit is discharged.

With reference to the bag closure and delivery unit M, it will be noted that the filled bags after being delivered from the bag-holding instrumentalities to the endless conveyor L are gripped on opposite sides by the sponge-like or other resilient material elements 102 of the endless vertical conveyors O and P, and the mouth of the bags are gripped by suitably mounted endless chains or belts 103 and 104 and directed in a straight line through the sewing machine 105 where the mouth is closed by a line of stitching, not shown, for delivery from the sewing machine 105. Suitable means, not shown, may be provided for severing the stitching between the successive bags.

Said conveyor L is mounted at its front end on shaft 107 and at its rear end on drive shaft 108 and the vertical conveyors O and P are mounted at their receiving ends on vertical shafts 109 and at their discharging ends on vertical drive shafts 110.

The driving arrangement with respect to the three coacting units of the machine from a source of power is diagrammatically illustrated in Fig. 17. Said source of power comprises an electric motor 111, in the present instance, mounted beneath the rear end of the distributor mechanism A and adjacent the filled bag closure and delivery unit M. The drive from said motor is through a motor shaft 112 which extends rearwardly to a gear box 113 adjacent the end of the bag closure unit M and therefrom through shaft 114, pulley 115 mounted thereon, belt 116, pulley 117 mounted on drive shaft 108, driving conveyor L, and through gear connections between shaft 108 and shafts 110, driving the vertical conveyors O—P, and through the vertically adjustable drive sprockets 118 driving the gripping chains or belts 103 and 104. Mounted on shaft 112 is pulley 119 which drives sewing machine 105 by a belt 120. A second motor shaft 121 extending in a direction opposite to shaft 112 has mounted thereon pulley or sprocket 122 connected by a belt or chain 123 with pulley 124 mounted on shaft 125 connected with gear box 126, and connected with said gear box is shaft 49 of sprocket H which drives conveyor chain F to which are attached the bag holder carriage mechanisms E. The free end of said motor shaft 121 is connected with gear box 127, and having connection therein with shaft 128 on which is mounted pulley or sprocket 129, and by belt or chain 130 with pulley or sprocket 19 mounted on drive shaft 18 and pinion 17 meshing with gear wheel 16 on shaft 15 of distributor roller conveyor A for driving the latter.

It will be apparent that I have provided a machine for packaging citrus fruit and the like, embodying improved means for distributing and feeding said articles to a battery of feed chutes, in which are mounted means for ejecting the lowermost fruit from each chute to bags traveling throughout the length of said chutes in succession carried by bag-holding mechanisms, and for delivering from the bag-filling mechanism the filled bags to be conveyed to and through a bag closure and delivery mechanism.

As hereinbefore stated the subject matter of the first and third mechanisms have been more clearly described and claimed in my co-pending applications, and, therefore, as to this application, it will be noted that I have provided improved bag holders, carriage and track assembly, for effecting the continuous travel of successive bags through the bag-filling instrumentalities, and including novel bag carriage assemblies attached to an endless conveyor means and cooperating mechanisms mounted on the frame and the respective carriages for operating the bag-holding jaws initially to collapsed position to receive a bag at a loading station, said jaws upon completion of the collapsing movement being expanded to expand and hold a bag thereon automatically by means carried by the jaws, and further cooperating means at the discharging station for collapsing the jaws for withdrawal from each of the filled bags, said mechanism being comparatively simple in construction and operation, manufacturable at a reasonable cost, and efficient for the purposes intended.

Although in practice I have found that the form of my present invention illustrated in the accompanying drawings and referred to in the above description as the preferred embodiment, is the most efficient and practical, yet realizing that conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. Apparatus for filling bags with fruit or other spherical objects, including loading and discharging stations, which comprises, in combination, a distributing conveyor, a series of trough article-feeding means adapted to receive articles uniformly distributed thereto by the distributing conveyor, mechanism for discharging a predetermined number of the articles from the trough-like feeding means, a machine frame defining a conveyor track, a conveyor element mounted on the track, conveyor actuating and guiding means, bag-holding instrumentalities supported on the frame, the bag-holding instrumentalities comprising a series of carriages, means connecting the carriages to the conveyor element, each of the carriages comprising a pair of arms, a pair of cooperating bag-holding devices carried by the arms for receiving and holding the bags to be filled, cam means adjacent to the loading station for enabling actuation of the bag-holding devices to receive a bag, means for actuating the said bag-holding devices to retain the bag thereon, double cam means adjacent to the discharge station to enable further actuation of the said bag-holding devices for releasing the now-filled bag therefrom, means mounted on the carriages adapted to engage the cams to operate the devices, and means on each of the carriages for actuating the discharging mechanism in succession responsively to the bags held by the successive devices being brought by the conveyor element into juxtaposition relative to the said feeding means for receiving a predetermined number of articles from each of the trough-like article-feeding means.

2. Apparatus for filling bags with fruit or other spherical objects, including loading and discharging stations, which comprises, in combination, a distributing conveyor adapted to receive the articles from a source of supply, a series of article feeding means adapted to receive the articles uniformly from the said distributing conveyor, a frame positioned beneath the said distributing conveyor and feeding means, a continuously moving conveyor element on the frame, bag-holding instrumentalities comprising a series of frame-like carriage elements attached to the conveyor element, a track for the carriage elements, means for mounting the carriage elements on their track, a pair of complemental bag-holding devices pivotally mounted on each carriage, actuating-means for the bag-holding devices mounted on the carriage, means mounted on the frame cooperating with the said actuating means at the loading station and at the discharging station, the said actuating means on each of the carriages and the said means on the frame being adapted to cooperate to close the bag-holding devices at the loading station to receive a bag, and for closing the said devices at the discharging station for releasing the now-filled bag, discharge means for the said article-feeding means, and instrumentalities on each of the carriages for operating the discharge means responsively to each bag of a series thereof coming into juxtaposition with the feeding means in succession, each bag thereby receiving a predetermined number of the articles at each of the feeding means, and means mounted on the bag-holding devices adapted to hold said devices in expanded position between the loading station and the discharging station.

3. Apparatus for filling bags with fruit or other spherical objects, including loading and discharging stations, which comprises, in combination, a machine frame, an endless conveyor mounted on said frame, means for driving said conveyor, a carriage track mounted on the frame, bag-holding instrumentalities comprising a series of carriages mounted on the carriage track, means for operatively connecting each of the carriages to the conveyor for movement with the conveyor, means for mounting each carriage on its track and adapted to prevent its lateral displacement, a lower supporting track on the frame, a roller supporting arm connected to the carriage, and engaging the lower track to continuously maintain the carriage in substantially horizontal position, a pair of complemental bag-holding jaws mounted on the carriage adapted to hold the bag to be filled, a relatively long cam bar extending along said frame, a cam on the bar adjacent to a loading station for the bags, a roller on each of the carriages engaging said bar, link means connecting the roller with one of the bag-holding jaws for relatively shifting said jaws to closed position responsively to engagement of the roller with the said cam adjacent to the loading station to receive a bag, means for expanding the jaws upon disengagement of said roller from the cam, a second relatively short cam bar adjacent to the discharging station, corresponding cams on each of the said cam bars adjacent to the discharging station, a second arm mounted on each carriage, a second cam-engaging roller mounted on said second arm, means connecting the said second arm to the other jaw of the said pair, whereby upon engagement of both cam rollers with the said cams at the discharging station the jaws are shifted to closed position for effecting their withdrawal from the now-filled bag, roller means also mounted on the said second arm, and a series of article-feeding means adapted and arranged to supply a predetermined number of the articles to each bag, as each of the bags is brought into juxtaposition thereto by its carriage, the said series of article feeding means being engaged in succession by the said roller means.

4. Apparatus for filling bags with fruit or other spherical objects, including loading and discharging stations, which comprises, in combination, a machine frame, a conveyor track mounted thereon, means for driving said conveyor, a track mounted on the frame, bag-holding instrumentalities comprising a series of carriages mounted on the track, means for operatively connecting each of the carriages to the conveyor, a relatively long cam bar on the frame extending substantially the length of said frame, a cam in the bar adjacent to the loading station, a second, relatively short cam bar adjacent to the discharging station, corresponding cams in each of the said cam bars adjacent to the discharging station, each of the said carriages comprising roller means for mounting the carriages on the carriage track, oppositely disposed rollers mounted on the carriage below the said roller means for preventing lateral displacement of the carriage, a pair of substantially horizontally extending arms mounted on the carriage, a pair of complemental bag-holding jaws mounted between said arms and adapted to hold a bag to be filled, the said jaws defining, when closed, an approximately elliptical configuration enabling ready application of the bag to the said jaws, a rocker bar mounted on said arms, an arm on the said bar, a roller mounted on said arm adapted to engage the short cam bar adjacent to the discharging station, link means connecting the said arm to one of said bag-holding jaws, a second roller mounted on said arm, another roller carried by the carriage adapted to engage the long cam bar, link means connecting the latter roller to the other bag-holding jaw, means actuated by said second roller for discharging a predetermined number of the articles into the bag carried by said jaws when the bag is moved into successive article-receiving position, engagement of the cam-engaging roller of the carriage with the cam in the cam bar causing first a closing of the jaws to receive the bag, the jaws then opening to hold the bag, then both bar-engaging rollers coacting with their cams at the discharging station to shift the jaws to closed position for enabling the now-filled bag to be removed from the jaws, a supporting roller carrying arm for the carriage for preventing tilting thereof, and a track for said arm.

5. Apparatus for filling bags with fruit or other spherical objects, including loading and discharging stations, which comprises, in combination, a machine frame, a conveyor mounted on the frame, means for driving and guiding a conveyor, a carriage track mounted on the frame, bag-holding instrumentalities comprising a series of carriages mounted on the carriage track, means for operatively connecting each of the carriages to the conveyor, each carriage comprising a pair of spaced substantially horizontally disposed arms, a pair of bag-holding jaws mounted between the arms, means pivotally connecting the jaws to each other and to the arms, means rigidly interconnecting the said arms, a roller assembly adjacent to each of said arms mounted on said connecting means, each of the roller assemblies comprising a vertical roller adapted to engage and run upon the top surface of the carriage track and a pair of oppositely disposed rollers adapted to engage opposite vertical faces of the carriage track for preventing lateral displacement of the carriages, cooperating means on the machine frame and on the carriage for shifting the jaws to collapsed position adjacent the loading station to receive a bag, means in connection with the jaws then acting to expand the jaws within the bag, said cooperating means then shifting the jaws from expanded to closed position adjacent to a discharging station for enabling removal of the filled bag therefrom, and means in connection with the carriage for continually supporting the carriage in horizontal position.

6. Apparatus for filling bags with fruit or other spherical objects, including loading and discharging stations, which comprises, in combination, a machine frame defining a carriage track, a conveyor mounted on the frame, means for driving and guiding said conveyor, a carriage track mounted on the frame, bag-holding instrumentalities comprising a series of carriages mounted on the carriage track, means for operatively connecting each of the said carriages to the conveyor for movement of each carriage with the conveyor, vertically disposed roller means for mounting the carriage on the carriage track, cooperating longitudinally disposed roller means mounted on the carriage and disposed on opposite sides of the carriage track for preventing lateral displacement of the carriage, each of the carriages comprising a pair of spaced parallel arms, a pair of bag-holding jaws mounted on the carriage between the said arms, means pivotally interconnecting the jaws to one another and to said arms, and cooperating means on the machine frame and on the carriage for shifting the said jaws, first, to closed position adjacent to the loading station for receiving a bag, and then, subsequent to an opening movement of the jaws, and adjacent to the discharging station, to shift the jaws from open position to closed position for enabling the removal of the now-filled bag from the jaws.

7. Apparatus for filling bags with fruit or other spherical objects, including loading and discharging stations, which comprises, in combination, a machine frame, a carriage and track assembly carried thereby, and including a carriage-supporting track, an endless conveyor associated therewith, and a plurality of bag holder carriage elements adapted to supportingly travel on said track, each of the carriage elements including collapsible jaw members adapted to engage in the open mouth of a bag and expansible to supportingly carry the said bag during its filling travel through the machine, feeding means carried by the frame adapted to supply the fruit to the bags and mechanism on the carriage elements for operating the feeding means through a selected interval of time for supplying the same number of articles of fruit to each bag responsively to the movement of the bag by the carriage elements into article-receiving position.

8. Apparatus for filling bags with fruit or other spherical objects including loading and discharging stations, which comprises, in combination, a machine frame, a carriage and track assembly carried thereby, and including a carriage-supporting track, an endless conveyor associated therewith, a plurality of bag holding carriage elements connected to the conveyor, each of the said carriage elements including pivotally mounted jaws constructed and operable about their pivots for effecting collapsing of the jaws and actuating them to a position for expeditious insertion in the mouth of an empty bag, and then operable to expand the jaws to bag holding and carrying position at a predetermined point in their travel and automatically operable to actuate the respective jaws in collapsed relation about their pivots in a direction with respect to the carriage to effect their withdrawal from the filled bag upon reaching a predetermined point in their further travel with respect to the machine frame, means on the machine frame for expanding the jaws of the successive carriage elements as the said elements pass successively a predetermined station for securing a bag placed in position on the jaws, a feeding means carried by the frame for supplying fruit to the bags held on the jaws, means mounted on the carriage elements engaging the feeding means for actuating the feeding means as the carriage elements reach predetermined position relative to the feeding means and for maintaining the feeding means active through a definite interval of time for supplying the same number of fruit to each bag as succeeding bags pass the said feeding means, and means for automatically collapsing the jaws of the successive carriage elements after each bag traverses the length of the said feeding means for effecting withdrawal of the jaws from the now-filled bags, as the carriage elements successively reach said collapsing means.

9. Apparatus for filling bags with fruit or other spherical objects, including loading and discharging stations, which comprises, in combination, a machine frame defining a conveyor track, a conveyor mounted on the track, conveyor actuating means carried by the machine frame, a series of bag-holding carriages carried by the conveyor, means for connecting the carriages to the conveyor, each of the carriages defining a pair of arms, a pair of complemental bag-holding jaws carried by the arms and adapted to receive the bags to be filled, means pivotally interconnecting the jaws and spring means connecting one of the jaws to the arm carrying the other jaw for urging the jaws in separating direction for automatically expanding them into bag-retaining position in the mouth of a bag to be filled when the jaws are inserted into the bag.

10. Apparatus for filling bags with fruit or other spherical objects, including loading and discharging stations, which comprises, in combination, a machine frame defining a conveyor track, a conveyor mounted on the track, conveyor actuating means carried by the machine frame, a series of bag-holding carriages connected to the conveyor and moved along the frame thereby, a track for the carriages, means for mounting the carriages on the track, each of the carriages comprising a frame-like structure including a pair of spaced arms, a pair of complemental bag-holding jaws carried by the arms, means pivotally interconnecting the jaws, cam means on the frame at the loading station for actuating the bag-holding means to closed position for receiving a bag, and coil spring means interconnecting one of the jaws to the arm carrying the other jaw for urging the jaws into expanded position in the mouth of a bag to be filled when the jaws are inserted into the bag, the said coil spring means enabling the jaws to receive bags of different sizes.

11. Apparatus for filling bags with fruit or other spherical objects, which comprises, in combination, a machine frame, a track assembly carried by the machine frame, and a carriage assembly mounted on the track assembly, the track assembly including an upper track bar, a lower track bar spaced substantially below the upper track bar, and an intermediate track bar positioned intermediate the upper and lower track bars, a conveyor track mounted behind the intermediate track, and a conveyor mounted on the conveyor track, each carriage assembly including a mounting plate secured to the conveyor, a pair of spaced, parallel forwardly extending arms projecting from the mounting plate, a pair of complemental bag-holding members intermediate the arms, a cam on the upper track bar adjacent to each end of the machine frame, mechanism carried by the mounting plate cooperating with the cams to actuate the bag-holding members for securing in filling position a bag mounted on the members, a second cam bar adjacent to the upper track bar at an unloading station for the bags, instrumentalities operable by engagement thereof with the cam bar and adjacent cam in the upper track bar for collapsing the bag holding members for permitting removal of the now-filled bag therefrom, and brace means for the carriage assembly for supporting the carriage assembly by engagement with the lower track bar.

12. Apparatus for filling bags with fruit or other spherical objects, which comprises, in combination, a machine frame, a track assembly carried by the machine frame, and a carriage assembly mounted on the track assembly, the track assembly including a plurality of track bars paralleling the machine frame, one of the said bars extending the length of the machine frame and including a pair of spaced-apart cam members, a conveyor track and conveying means mounted on the track for travel thereon, each carriage assembly including mounting means connected to the conveying means, a pair of bag-carrying members carried by the mounting means, instrumentalities on the mounting means cooperating with one of said cam members for first actuating the bag-carrying members into bag-holding position, and then after the carriage assembly has moved through a predetermined distance for cooperating with the other of said cam members for actuating the bag-carrying members in an opposite direction for releasing a filled bag therefrom, and means on the carriage assembly for actuating fruit-supplying means for filling the bag as the carriage assembly travels along the track assembly.

13. Apparatus for filling bags with fruit or other spherical objects, which comprises, in combination, a machine frame, a track assembly carried by the machine frame, and a carriage assembly mounted on the track assembly, the track assembly including a plurality of track bars paralleling the machine frame, one of the bars extending the length of the machine frame and another of the bars being a relatively short bar adjacent to a discharge station for the apparatus, the first-mentioned track bar being provided with spaced-apart cam portions, the first of which is adjacent to a loading station and a second of which is adjacent to the discharge station, the relatively short bar having a cam portion adjacent to the second cam portion in the first-mentioned track bar, a conveyor track and conveying means mounted on the track for travel therealong, each carriage assembly including mounting means connected to the conveying means, a pair of complemental bag-carrying members carried by the mounting means, and instrumentalities on the mounting means cooperating with the said cam portions first to position the bag-carrying members into bag-carrying position and then to shift the bag-carrying members into bag-releasing position, the said instrumentalities including bell-crank portions for the bag-carrying members, actuating means for one of the bell-crank portions including means in engagement with the said first-mentioned track bar following the said bar including the cam portions of the said bar, and motion-transmitting means transmitting motion of the said bar-engaging means responsive to movement thereof along the said track bar to its bell-crank portion to shift the bag-carrying members into bag-carrying position, second actuating means for another of the bell-crank portions of the carrying members adapted to engage the cam portion of the relatively short bar as the carriage assembly approaches the discharge station, and motion-transmitting lever means connecting the second actuating means with its bell-crank portion of the bag-carrying members into bag-releasing position as the carriage assembly reaches the discharge station.

14. Apparatus for filling bags with fruit or other spherical objects, which comprises, in combination, a machine frame, a carriage and track assembly carried thereby including a plurality of spaced bars including an upper track bar, a lower track bar spaced substantially from the upper track bar in substantially the same vertical plane, an intermediate track bar positioned intermediate the upper and lower track bars and forwardly thereof, and a conveyor track on the machine frame positioned behind the intermediate track bar, a conveyor therefor, a plurality of bag-holder carriage elements mounted on the track assembly, each carriage element including a mounting plate having an arm portion projecting rearwardly and secured to the conveyor, a pair of spaced parallel, forwardly extending arms projecting from the mounting plate, a pair of complemental bag-holding jaw members intermediate the arms and pivotally secured thereto, a plurality of cooperating rollers mounted on the carrier frame and bearing against the intermediate track-bar for enabling travel of the carriage elements along the conveyor frame, an actuating arm pivotally secured to one of the jaw members, a link pivotally secured to the actuating arm, a roller on the link engaging the said upper track bar, an actuating link arm pivotally secured to the other of the complemental jaw members, a rocker bar mounted intermediate the arms, an actuating lever for the rocker bar, the actuating link arm being secured to the roller bar, roller means in the actuating lever for the rocker bar, a cam on the upper track bar in advance of a bag-filling station for relatively actuating the jaw members for expanding them in the mouth portion of a bag to be filled with fruit, as the roller means engaging the upper track bar pass over the cam, a second cam on the upper track bar adapted to be engaged by the said roller means and a second cam bar positioned beneath the said second cam and engaged by the roller means in the actuating lever for the rocker bar for effecting a closing movement between the jaw members for releasing the now-filled bag, a supporting arm depending from the said bearing plate, and roller means carried by the bracket arm in engagement with the lower track bar for supporting the carriage assembly.

15. An apparatus for filling bags with fruit or other spherical objects, including loading and discharging stations, which comprises in combination, a machine frame, conveyor and carriage tracks mounted on the frame, an endless conveyor on said conveyor track and means for driving said conveyor, a plurality of bag-holding carriages mounted on said carriage track, means for operatively connecting each of the respective carriages to said conveyor for movement therewith, each of the carriages comprises track engaging means and a pair of spaced arms, a pair of bag-holding jaws mounted between the arms, means pivotally interconnecting the jaws to one another and to said arms, and cooperating means on the machine frame and on the carriage for shifting the jaws, adjacent the loading station, first momentarily, to closed position to receive the bag and then to open position to hold the bag during its filling operation travel, and then, adjacent to the discharging station, to shift the jaws to closed position for enabling their withdrawal from the filled bag.

JACK W. CARTER.

References Cited in the file of this patent

UNITED STATES PATENTS

| Number | Name | Date |
|---|---|---|
| 1,058,747 | Hoepner | Apr. 15, 1913 |
| 1,122,334 | Taylor | Dec. 29, 1914 |
| 1,125,802 | Bracy | Jan. 19, 1915 |
| 1,709,189 | Radtke | Apr. 16, 1929 |
| 1,850,418 | Sankey | Mar. 22, 1932 |